United States Patent [19]

deSouza et al.

[11] Patent Number: 4,546,402

[45] Date of Patent: Oct. 8, 1985

[54] HERMETICALLY SEALED GAS TUBE SURGE ARRESTER

[75] Inventors: Alwyn A. deSouza; Andreas J. Eggendorfer, both of Goleta, Calif.

[73] Assignee: Joslyn Mfg. and Supply Co., Chicago, Ill.

[21] Appl. No.: 526,987

[22] Filed: Aug. 29, 1983

[51] Int. Cl.⁴ .............................................. H02H 9/06
[52] U.S. Cl. .................................... 361/120; 361/118; 361/129; 313/306; 313/325
[58] Field of Search .............. 361/120, 129, 117, 119, 361/118; 313/594, 595, 601, 602, 597, 306, 325, 308, 581, 170

[56] References Cited

U.S. PATENT DOCUMENTS

| | | | |
|---|---|---|---|
| 2,914,695 | 11/1959 | Meyer, Jr. et al. | 313/594 X |
| 3,187,215 | 6/1965 | Linkroum | 361/120 X |
| 3,350,604 | 10/1967 | Erickson | 315/241 P |
| 3,376,458 | 4/1968 | Liao | 361/120 X |
| 3,939,379 | 2/1976 | Sullivan et al. | 313/594 X |
| 3,989,973 | 11/1976 | Lange et al. | 313/594 |
| 3,989,985 | 11/1976 | Lange et al. | 361/120 |
| 4,056,753 | 11/1977 | Keikichi et al. | 313/325 |
| 4,084,208 | 4/1978 | Bazarian et al. | 361/120 |
| 4,287,548 | 9/1981 | Hahndorff | 361/120 |
| 4,410,831 | 10/1983 | Shigemori et al. | 313/325 |

FOREIGN PATENT DOCUMENTS

| | | | |
|---|---|---|---|
| 2641514 | 3/1978 | Fed. Rep. of Germany | 313/325 |
| 113115 | 5/1941 | United Kingdom | 361/129 |

Primary Examiner—Patrick R. Salce
Attorney, Agent, or Firm—Mason, Kolehmainen, Rathburn & Wyss

[57] ABSTRACT

An improved hermetically sealed gas tube surge arrester includes at least a pair of gap electrodes separated by an insulating spacer to form an electrode gap and a separate trigger electrode disposed about the region of the electrode gap for increasing the electrical field intensity in the region of the electrode gap. Preconditioning means is provided to direct an impulse voltage surge to the trigger electrode, prior to being impressed across the gap electrodes, thereby to precondition the electrode gap to breakdown at a relatively low impulse breakdown voltage.

17 Claims, 10 Drawing Figures

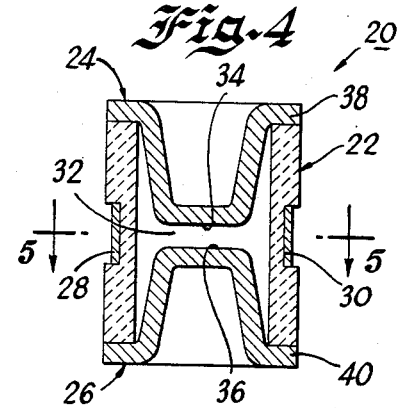
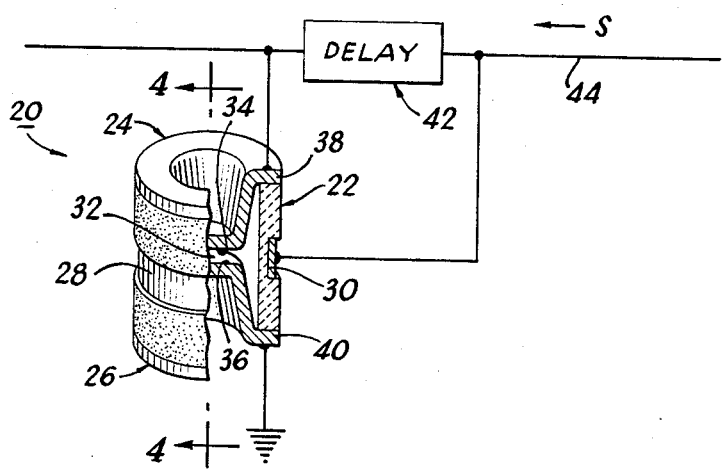
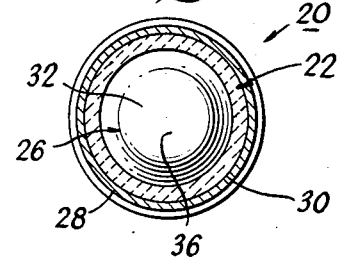
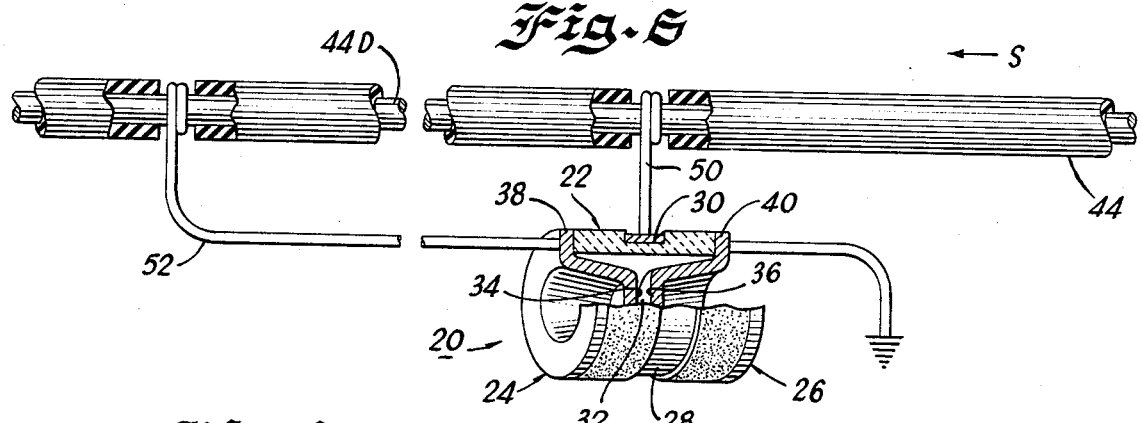
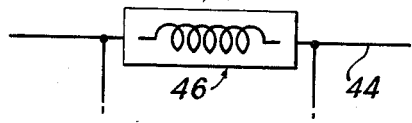
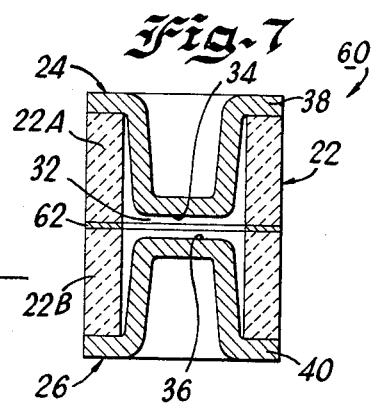
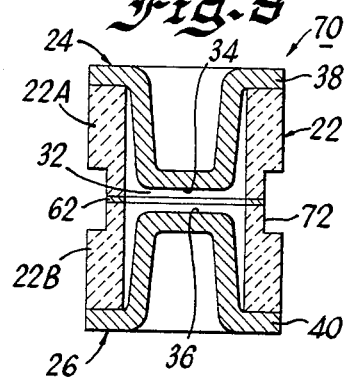

HERMETICALLY SEALED GAS TUBE SURGE ARRESTER

BACKGROUND OF THE INVENTION

1. Field of the Invention

The device of the present invention generally relates to hermetically sealed gas tube voltage breakdown devices, commonly referred to as surge arresters, and, more particularly, to a new and improved hermetically sealed gas tube surge arrester having a faster response time to impulse voltage surges.

2. Description of the Prior Art

Hermetically sealed gap tube voltage breakdown devices, commonly referred to as surge arresters, are old and well known in the art and are often used to protect electrical equipment from damage or destruction due to the presence of overvoltage surges. For example, pertinent prior art hermetically sealed gas tube surge arresters are disclosed in U.S. Pat. Nos. 3,588,576; 4,084,208; and 4,287,548.

Normally it is desirable that the sparkover or breakdown voltage of hermetically sealed gas tube surge arresters be independent from the rate of surge voltage increase, that is, dV/dt. While this is generally true with respect to known surge arresters for rates of surge voltage increase up to approximately $10^6$ volts per second, the impulse breakdown voltages for such surge arresters for rates of surge voltage increase above approximately $10^8$ volts per second are generally considerably higher than their DC or static breakdown voltages. The prior art patents referred to hereinabove describe attempts that have been made to reduce the difference between the impulse breakdown voltage and the DC breakdown voltage in a surge arrester and the variations in the impulse breakdown voltages resulting from impulse voltage surges having different rates of voltage increase. This problem is also addressed by the present invention.

SUMMARY OF THE INVENTION

An object of the present invention is to provide a new and improved hermetically sealed gas tube voltage breakdown device or surge arrester.

Another object of the present invention is to provide a new and improved hermetically sealed gas tube surge arrester wherein the difference between its impulse breakdown voltages and its DC breakdown voltage is minimized and the variation in the impulse breakdown voltages for voltage surges having different rates of voltage increase is reduced.

Briefly, the device of the present invention comprises a new and improved hermetically sealed gas tube voltage breakdown device or surge arrester that includes a trigger electrode and an insulating spacer for supporting and spacing apart a pair of gap electrodes that form an electrode gap therebetween. Preconditioning means are provided for directing an overvoltage surge to the trigger electrode prior to appearing across the gap electrodes thereby to precondition or ionize the electrode gap by means of the overvoltage surge itself. In this manner the electrode gap is preconditioned to breakdown at a much lower impulse breakdown voltage than would occur in the absence of the preconditioning means. Consequently, the difference between the DC breakdown voltage of the surge arrester and the impulse breakdown voltage of that surge arrester is reduced as is the variation in the impulse breakdown voltages for voltage surges having different rates of voltage increase. Such preconditioning means might comprise either a series electrical connection between the trigger electrode and one of the gap electrodes such that the overvoltage surge is first applied to the trigger electrode and, subsequently, to the gap electrode or time delay means, such as an electrical inductance means, an electrical resistor or a length of electrical conductor, electrically connected in series between one of the gap electrodes and the trigger electrode.

BRIEF DESCRIPTION OF THE DRAWING

The above and other objects, advantages and novel features of the present invention will become apparent from the following detailed description of the preferred embodiment and alternative embodiments of the present invention illustrated in the accompanying drawing wherein:

FIG 1 is a schematic view of a new and improved hermetically sealed gas tube surge arrester constructed and assembled in accordance with the principles of the present invention;

FIGS. 2, 3 and 6 are schematic views of illustrative preconditioning means capable of being used in the circuit of FIG. 1;

FIG. 4 is an enlarged cross-sectional view of the surge arrester of FIG. 1 taken along lines 4—4 of FIG. 1;

FIG. 5 is an enlarged plan sectional view of the surge arrest of FIG. 1 taken along line 5—5 of FIG. 4;

FIGS. 7 and 8 are enlarged cross-sectional views of alternative embodiments of the surge arrester depicted in FIGS. 1 and 4–6.

DESCRIPTION OF THE PREFERRED EMBODIMENT

Figure 9:
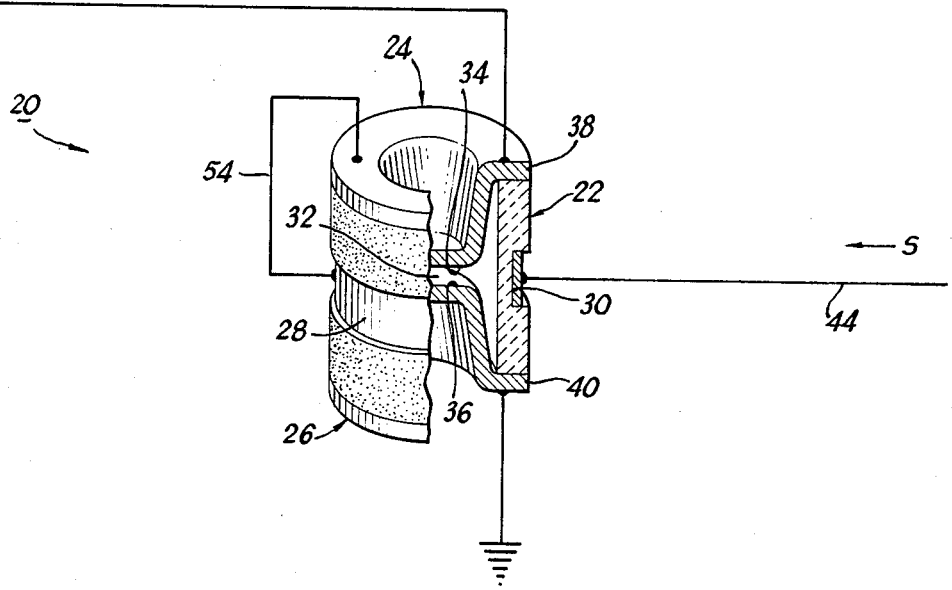
FIGS. 9 and 10 are schematic views of alternative embodiments of the surge arrester of FIG. 1 constructed and assembled in accordance with the principles of the present invention.

Referring to the drawing and initially to FIGS. 1–6, there is illustrated a new and improved hermetically sealed gas tube voltage breakdown device or surge arrester 20 constructed in accordance with the principles of the present invention. The surge arrester 20 includes an insulating spacer tube or spacer 22, preferably formed from a suitable ceramic, such as alumina; a pair of generally cup-shaped metal gap electrodes 24 and 26; and a flat, metal band or trigger electrode 28. The gap electrode 26 may be connected to a suitable reference potential (FIG. 1). In the embodiment of FIGS. 1 and 4–6, the trigger electrode 28 is in the form of an elongated metal band or ring disposed in a generally U-shaped elongated recess 30 formed in and along the outer periphery of the spacer 22 in the region of an electrode gap 32 defined by the most closely spaced portions 34 and 36, respectively, of the electrodes 24 and 26. Radially outwardly extending annular shoulder portions 38 and 40 of the electrodes 24 and 26, respectively, are sealed to the opposite longitudinal ends of the spacer 22 to form the hermetically sealed arrester 20.

In accordance with an important feature of the present invention, a preconditioning means is provided for directing an overvoltage surge first to the trigger electrode 28 and, subsequently, to the gap electrode 24 such that an impulse voltage surge traveling on an insulated electrical conductor 44 in the direction of arrow "S"

(FIGS. 1, 6, 9 and 10) will appear at the trigger electrode 28 prior to being impressed across the gap electrodes 24 and 26. In this manner, the electrode gap 32 is preconditioned or ionized by the impulse voltage surge itself to cause sparkover or breakdown of the electrode gap 32 and current conduction through the surge arrester 20 at a lower impulse breakdown voltage across the gap electrodes 24 and 26 than would be required to cause the sparkover or breakdown of the electrode gap 32 in the absence of the preconditioning means.

For example, suitable means for delaying an impulse voltage surge or time delay 42 may be electrically connected in series between the trigger electrode 28 and the gap electrode 24 (FIGS. 1 and 6). The time delay 42 may be of any suitable form. Illustrative devices for use as the time delay 42 are electrical inductance means 46 (FIG. 2), an electrical resistor 48 (FIG. 3) or a relatively long length of electrical conductor 44D disposed between a trigger electrode lead 50 and a gap electrode lead 52 (FIG. 6). Illustrative embodiments of the inductance means 46 are a coiled electrical conductor, with or without a core, or an electrical conductor in combination with ferrite beads, tubes or a toroidal core disposed thereabout. The precise values for the inductance of the inductance means 46, the resistance of the resistor 48 and the length of the conductor 44D will depend upon the desired value of the time delay 42 and upon the particular characteristics of the surge arrester 20, for example, its specific DC breakdown voltage.

Alternatively, the preconditioning means may include a series electrical short-circuit connection or lead 54 (FIG. 9) between the flat trigger electrode 28 and the gap electrode 24 such that an impulse voltage surge traveling on the electrical conductor 44 in the direction of the arrow "S" will appear first at the trigger electrode 28 and, subsequently, be applied to the gap electrode 24 through the series electrical connection 54.

Figure 10:
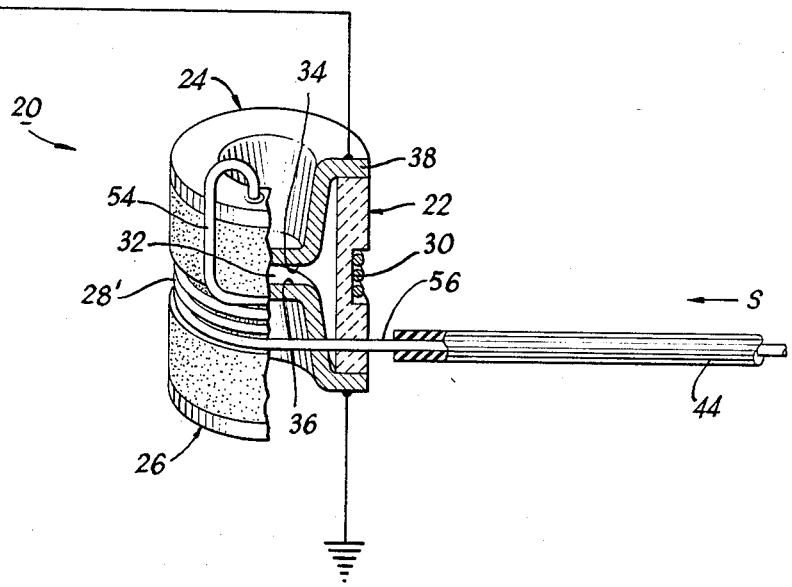

A further alternative embodiment of the preconditioning means is depicted in FIG. 10 wherein an elongated bared portion of a center or current carrying conductor 56 of the conductor 44 is disposed in coiled form, i.e., one or more turns, in the recess 30 of the spacer 22 to form a trigger electrode 28'. Preferably, an integral, elongated end portion of the conductor 56 forms the series electrical short-circuit connection or lead 54 between the trigger electrode 28' and the gap electrode 24 such that an impulse voltage surge traveling on the electrical conductor 44 in the direction of the arrow "S", will appear first at the trigger electrode 28' and, subsequently, be applied to the gap electrode 24.

In a specific embodiment of the present invention, the wall thickness along the length of the spacer tube 22 outside of the recess 30 may be in the range from about 0.020 inch to about 0.045 inch and, preferably, is in the range of from about 0.040 inch to about 0.045 inch; and the reduced wall thickness of the spacer tube 22 along the length of the recess 30 may be in the range of from about 0.015 inch to about 0.030 inch and, preferably, is in the range of from about 0.020 inch to about 0.025 inch. The linear spacing of the gap is, preferably, in the range of from about 0.003 inch to about 0.090 inch depending upon the voltage and response time requirements. The reduced wall thickness of the spacer tube 22 along the recess 30 in the region of the gap 32 significantly reduces the attenuation of an electrical trigger pulse or signal in that region caused by the dielectric constant of the spacer tube 22. This is particularly true with respect to the relatively high dielectric constant present when the spacer tube 22 is formed as a ceramic. In this manner, the electric field intensity in the region of the electrode gap 32 may be increased by the impulse voltage surge itself to precondition or ionize the electrode gap 32 to cause sparkover or breakdown of the electrode gap 32 at a relatively low impulse breakdown voltage.

As opposed to the embodiments of FIGS. 7 and 8, the spacer 22 of the surge arrester 20 electrically insulates the trigger electrode 28 from the region of the electrode gap 32. The hermetically sealed gas tube voltage breakdown devices or surge arresters 60 and 70 of FIGS. 7 and 8, respectively, are formed from a pair of elongated, cylindrical, ceramic spacer tube halves 22A and 22B that have annular conductive material or an integrally formed trigger electrode 62 disposed therebetween. The longitudinal ends of the spacer tube halves 22A and 22B are fixedly secured together to form a unitary spacer 22 with a trigger electrode 62 disposed in the region of the electrode gap 32. The annular conductor material 62 may be a suitable brazing material, such as a silver brazing alloy, for brazing together the metalized ends of the spacer tube halves 22A and 22B.

The spacer 22 of the surge arrester 60 is formed with a uniform wall thickness (FIG. 7); and the spacer 22 of the surge arrester 70 is formed with a reduced wall thickness in the region of the electrode gap 32 in the form of a U-shaped elongated recess 72 formed in and about the outer periphery of the spacer 22 to provide a reduced wall thickness in the region of the electrode gap 32 in the size ranges referred to hereinabove with respect to the recess 30 (FIGS. 1 and 4–6). If desired, the surge arrester 60 and/or the surge arrester 70 may include a flat band or ring of conductive material, essentially identical to the trigger electrode 28 (FIGS. 1 and 4–6), disposed about the trigger electrode 62 (and within the recess 72 in the surge arrester 70) in the region of the electrode gap 32 for electrically connecting the trigger electrode 62 to the electrical conductor 44. Alternatively, the trigger electrode 62 of the surge arrester 60 or of the surge arrester 70 may be directly electrically connected to the electrical conductor 44.

Obviously, many modifications and variations of the present invention are possible in light of the above teachings. For example, it will become apparent to those of ordinary skill in the art that time delay devices other than the specific embodiments depicted in FIGS. 2, 3 and 6 may be used as the time delay 42 (FIG. 1) between the trigger electrode 28 and the gap electrode 24. Thus, it is to be understood that, within the scope of the appended claims, the invention may be practiced otherwise than as specifically described hereinabove. The term "ceramic" with reference to the spacer 22 is used herein in the European sense to designate a spacer 22 formed at a high temperature from nonmetallic, inorganic, earthy or clay material, other than glass.

What is claimed and desired to be secured by Letters Patent is:

1. A hermetically sealed gas tube surge arrester comprising
a first gap electrode,
a second gap electrode,
an electrode gap formed between and defined by the most closely spaced portions of said gap electrodes,
an elongated insulating spacer disposed between said gap electrodes, said first gap electrode being hermetically sealed to one longitudinal end of said spacer and said second gap electrode being hermetically sealed to an opposite longitudinal end of said spacer and said electrode gap being interiorly disposed within said spacer, a third electrode physically disposed about the outer periphery of said spacer and along the length of said spacer between said one and said opposite longitudinal ends of said spacer such that said third electrode is physically spaced apart from said gap electrodes by said spacer and is electrically insulated from at least one of said gap electrodes and from said electrode gap by said spacer, and preconditioning means electrically connected between said first gap electrode and said third electrode for enabling an impulse voltage surge to be applied to said third electrode prior to being applied across said gap electrodes and for preconditioning said electrode gap to sparkover at a lower impulse breakdown voltage than would be required to cause said electrode gap to sparkover in the absence of said preconditioning means.

2. A hermetically sealed gas tube surge arrester as recited in claim 1 wherein said insulating spacer comprises a tubular insulating spacer having a nonuniform wall thickness, the wall thickness of said insulating spacer being less in the region of said electrode gap than the wall thickness of said insulating spacer outside of the region of said electrode gap.

3. A hermetically sealed gas tube surge arrester as recited in claim 1 wherein said insulating spacer includes a generally U-shaped elongated recess formed in and about the outer periphery of said insulating spacer generally in the region of said electrode gap, said recess being at least partially defined by a thin wall portion of said insulating spacer, said thin wall portion having a wall thickness in the range of from about 0.015 inch to about 0.030 inch.

4. A hermetically sealed gas tube surge arrester as recited in claim 2 wherein said wall thickness in the region of said electrode gap is in the range of from about 0.020 inch to about 0.025 inch.

5. A hermetically sealed gas tube surge arrester as recited in claim 1 wherein said first and second gap electrodes respectively comprise first and second generally cup-shaped metal gap electrodes.

6. A hermetically sealed gas tube surge arrester as recited in claim 1 wherein said preconditioning means comprises time delay means electrically connected between said first gap electrode and said third electrode such that said impulse voltage surge is adapted to be applied to said third electrode and subsequently, after the time delay of said time delay means, is adapted to be applied across said gap electrodes.

7. A hermetically sealed surge arrester as recited in claim 6 wherein said time delay means comprises an electrical inductance means.

8. A hermetically sealed gas tube surge arrester as recited in claim 6 wherein said time delay means comprises an electrical resistor.

9. A hermetically sealed gas tube surge arrester as recited in claim 1 wherein said electrode gap comprises a single electrode gap and the only electrode gap interiorly disposed within said spacer.

10. A hermetically sealed gas tube surge arrester as recited in claim 9 wherein said electrode gap has a linear gap spacing in the range of from about 0.003 inch to about 0.090 inch.

11. A hermetically sealed gas tube surge arrester as recited in claim 1 wherein said third electrode comprises a flat metal band.

12. A hermetically sealed gas tube surge arrester as recited in claim 1 wherein said third electrode comprises an elongated portion of an electrical conductor used to transmit said impulse voltage surge to said surge arrester.

13. A method of reducing the impulse breakdown voltage of an electrode gap formed between first and second gap electrodes of a hermetically sealed gas tube surge arrester and interiorly disposed within an elongated insulating spacer of said hermetically sealed gas tube surge arrester comprising the steps of physically disposing a third electrode about the outer periphery of said spacer generally in the region of said electrode gap but physically spaced from and electrically insulated from said electrode gap and the interior of said spacer by said spacer and physically spacing said third electrode from said first and second gap electrodes and electrically interconnecting said first gap electrode and said third electrode exteriorly of said spacer with an electrical interconnection such that an impulse voltage surge is adapted to be applied to said third electrode prior in time to being applied across said first and second gap electrodes to enable said electrode gap to be preconditioned to breakdown at a lower impulse breakdown voltage than would be required to cause said electrode gap to breakdown in the absence of said electrical interconnection between said first gap electrode and said third electrode.

14. A method of reducing the impulse breakdown voltage of an electrode gap formed between first and second gap electrodes of a hermetically sealed gas tube surge arrester and interiorly disposed within an elongated insulating spacer of said hermetically sealed gas tube surge arrester as recited in claim 13 further comprising the step of forming an elongated recess exteriorly along the length of said insulating spacer generally in the region of said electrode gap to form a continuous thinner wall portion of said insulating spacer in the region of said electrode gap as compared to the thicker wall portions of said insulating spacer outside of said recess.

15. A method of reducing the impulse breakdown voltage of an electrode gap formed between first and second gap electrodes of a hermetically sealed gas tube surge arrester and interiorly disposed within an elongated insulating spacer of said hermetically sealed gas tube surge arrester as recited in claim 14 wherein said physically disposing step includes the step of physically disposing said third electrode about the outer periphery of said spacer in said recess.

16. A method of reducing the impulse breakdown voltage of an electrode gap formed between first and second gap electrodes of a hermetically sealed gas tube surge arrester and interiorly disposed within an elongated insulating spacer of said hermetically sealed gas tube surge arrester as recited in claim 13 wherein said electrically interconnecting step comprises the step of connecting said third electrode electrically in series with said first gap electrode such that said impulse voltage surge must pass through said third electrode prior to being applied across said first and second gap electrodes.

17. A method of reducing the impulse breakdown voltage of an electrode gap formed between first and second gap electrodes of a hermetically sealed gas tube surge arrester and interiorly disposed within an elongated insulating spacer of said hermetically sealed gas tube surge arrester as recited in claim 13 wherein said electrically interconnecting step comprises the step of connecting time delay means for delaying said impulse voltage surge electrically in series between said first and third electrodes such that said impulse voltage surge is adapted to be applied to said time delay means and to said third electrode prior to being applied across said first and second gap electrodes and subsequently after the time delay of said time delay means is adapted to be applied across said first and second gap electrodes.

* * * * *